United States Patent
Takemoto et al.

(10) Patent No.: US 10,367,427 B2
(45) Date of Patent: Jul. 30, 2019

(54) RESONANT INVERTER DEVICE

(71) Applicant: DENSO CORPORATION, Kariya, Aichi-pref. (JP)

(72) Inventors: Shoichi Takemoto, Kariya (JP); Hideo Naruse, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/163,937

(22) Filed: Oct. 18, 2018

(65) Prior Publication Data
US 2019/0123663 A1    Apr. 25, 2019

(30) Foreign Application Priority Data
Oct. 19, 2017 (JP) .................... 2017-202498

(51) Int. Cl.
| | | |
|---|---|---|
| *H03M 7/42* | (2006.01) | |
| *H02M 7/48* | (2007.01) | |
| *H02M 1/08* | (2006.01) | |
| *H02M 7/53846* | (2007.01) | |
| *H02M 1/00* | (2006.01) | |

(52) U.S. Cl.
CPC ........... *H02M 7/4826* (2013.01); *H02M 1/08* (2013.01); *H02M 7/538466* (2013.01); *H02M 2001/0048* (2013.01); *H02M 2007/4815* (2013.01)

(58) Field of Classification Search
CPC ............ H02M 7/42; H02M 7/538466; H02M 7/4826; H02M 2001/0048
USPC ......... 363/16–17, 34, 39, 71–75, 84, 89, 94, 363/115–120, 132, 134–136; 307/45–48, 307/64–66, 125; 320/140, 167
See application file for complete search history.

(56) References Cited

U.S. PATENT DOCUMENTS

| | | | | |
|---|---|---|---|---|
| 5,135,725 A | * | 8/1992 | Hendrickson | C01B 13/115 204/176 |
| 6,018,467 A | * | 1/2000 | Majid | H02M 3/33523 363/16 |
| 9,698,684 B2 | * | 7/2017 | Wu | H02M 3/158 |
| 9,743,463 B2 | * | 8/2017 | Laghi | B05B 9/002 |
| 2004/0027112 A1 | * | 2/2004 | Kondo | H02J 3/04 323/355 |
| 2014/0000246 A1 | | 1/2014 | Hosoya et al. | |
| 2016/0234921 A1 | | 8/2016 | Tabata et al. | |

FOREIGN PATENT DOCUMENTS

JP        2018-164328        10/2018

* cited by examiner

*Primary Examiner* — Rajnikant B Patel
(74) *Attorney, Agent, or Firm* — Nixon & Vanderhye P.C.

(57) ABSTRACT

In a resonant inverter device, a main circuit is configured to convert input power supplied from a direct-current (DC) power source into alternating-current (AC) power and supply the AC power to a resonance load as output power, and a controller is configured to control operations of the main circuit. In the controller, a deriver is configured to derive a power loss or circuit efficiency of the main circuit as a conversion loss parameter of the main circuit, and an input power calculator is configured to calculate an increased target output value by increasing the target output value using the conversion loss parameter, as a target value of input power that is input to the main circuit. In the controller, an operation controller is configured to control operations of the main circuit such that the calculated target value of the input power is input to the main circuit.

8 Claims, 20 Drawing Sheets

$T_A = 100$ ms $T_B \approx 12.5 \mu s$

RESONANT INVERTER DEVICE

CROSS-REFERENCE TO RELATED APPLICATION

This application is based on and claims the benefit of priority from earlier Japanese Patent Application No. 2017-202498 filed on Oct. 19, 2017, the description of which is incorporated herein by reference.

BACKGROUND

Technical Field

The present invention relates to a resonant inverter device for driving a resonance load.

Related Art

Conventionally, a resonant inverter device for driving a resonance load is known (see, for example, WO 2015/049782). Such a resonant inverter device includes a main circuit and a controller. The main circuit converts input power supplied from a direct-current (DC) power source into alternating-current (AC) power and supplies the AC power to the resonance load as output power. The controller controls operations of the main circuit.

The controller is connected to an external device. A target value of the output power (referred to as a target output value) is input from the external device to the controller. Under control of the controller, the input power of the same magnitude as the target output value is input to the main circuit, and the main circuit converts the input power into AC power as output power, thereby causing the main circuit to generate output power whose value is relatively close to the target output value.

However, in the above resonant inverter device, the output power may deviate from the target output value. That is, in operating the main circuit, switching elements and a transformer included in the main circuit generate heat, which may cause a power loss. Thus, when input power of the same magnitude as the target output value is input to the main circuit, the output power may be reduced by the power loss. The actual output power is thus likely to deviate from the target output value.

In view of the above, it is desired to have a resonant inverter device that can bring output power closer to a target output value.

SUMMARY

One aspect of the disclosure provides a resonant inverter device including: a main circuit configured to convert input power supplied from a direct-current (DC) power source into alternating-current (AC) power and supply the AC power to a resonance load as output power; an input power measurer configured to measure the input power; a controller configured to control operations of the main circuit. The controller includes: an input to which a target output value that is a target value of the output power is externally input; a deriver configured to derive a power loss or circuit efficiency of the main circuit as a conversion loss parameter of the main circuit; an input power calculator configured to calculate an increased target output value by increasing the target output value using the conversion loss parameter, as a target value of the input power; and an operation controller configured to control operations of the main circuit such that the calculated target value of the input power is input to the main circuit.

The resonant inverter device includes the deriver and the input power calculator. The deriver derives the power loss or circuit efficiency of the main circuit as the conversion loss parameter of the main circuit. The input power calculator increases the target output value using the conversion loss parameter to calculate the target value of the input power.

With this configuration, the output power can be brought close to the target output value. For example, when the power loss is used as the conversion loss parameter, the target input value can be set to a sum of the target output value and the power loss. When this target input value is input to the main circuit, the input power minus the power loss will be output as the output power. Therefore, the output power close to the target output value can be generated.

When the circuit efficiency is used as the conversion loss parameter, the target input value can be set to the target output value divided by the circuit efficiency. When this target input value is input to the main circuit, the input power multiplied by the circuit efficiency will be output as the output power. Therefore, the output power close to the target output value can be generated.

DESCRIPTION OF SPECIFIC EMBODIMENTS

Figure 1:
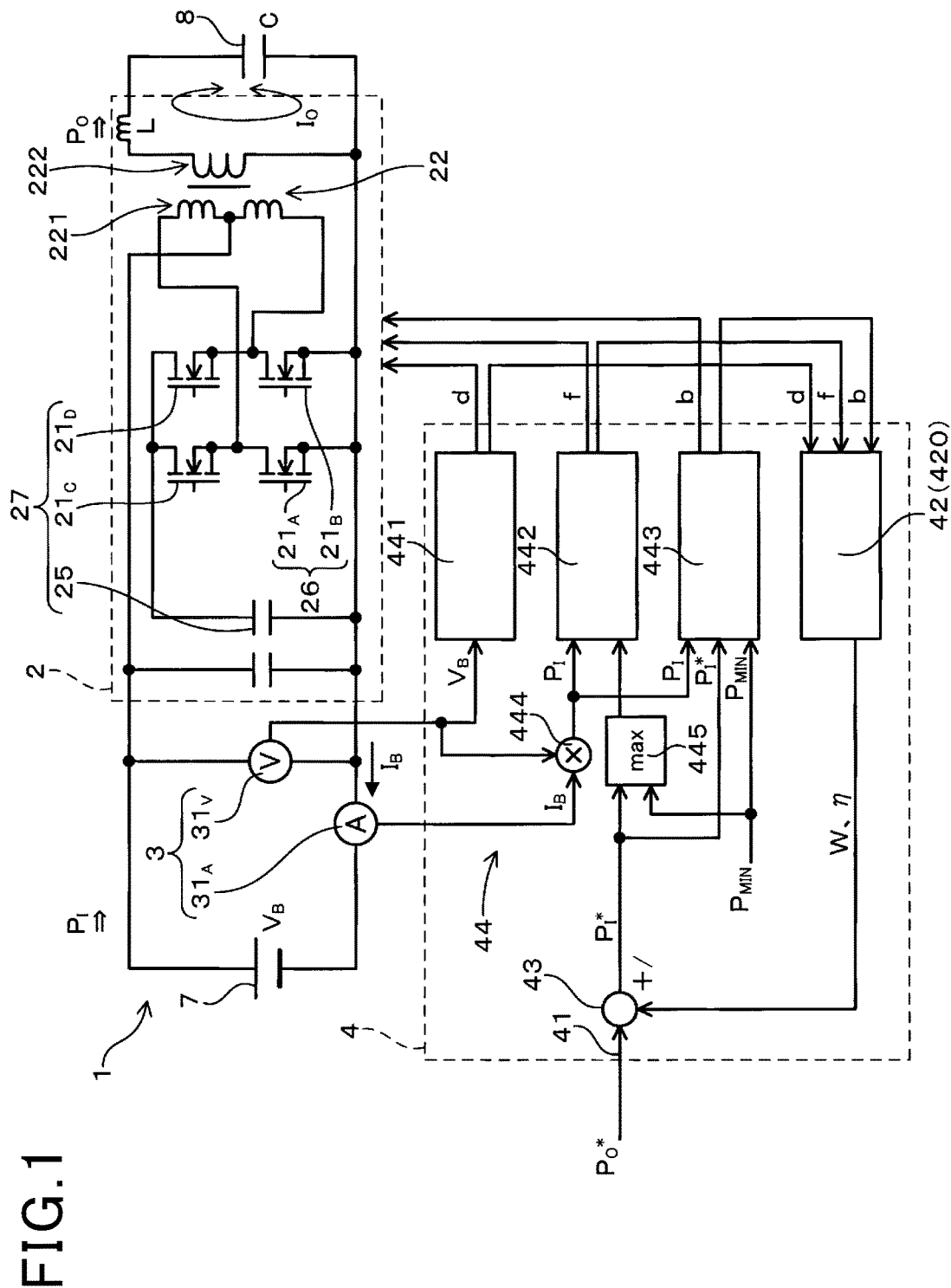
FIG. 1 is a circuit diagram of a resonant inverter device in accordance with a first embodiment of the present disclosure.

Hereinafter, exemplary embodiments of the present disclosure will be described in detail with reference to the accompanying drawings, in which like reference numerals refer to like or similar elements and duplicated description thereof will be omitted.

First Embodiment

A resonant inverter device in accordance with a first embodiment of the present disclosure will now be described with reference to FIGS. 1 to 7. As shown in FIG. 1, the resonant inverter device 1 includes a main circuit 2, an input power measurer 3, and a controller 4. The main circuit 2 converts input power $P_I$ supplied from a direct-current (DC) power source 7 into alternating-current (AC) power and then supplies the AC power to a resonance load 8 as output power $P_O$. The input power measurer 3 measures the input power $P_I$. The controller 4 controls operations of the main circuit 2.

The controller 4 includes an input 41, a deriver 42, an input power calculator 43, and an operation controller 44. A target output value $P_O^*$, which is a target value of the output power $P_O$, is externally input to the input 41. The deriver 42 derives a power loss W or a circuit efficiency η of the main circuit 2 as a conversion loss parameter of the main circuit 2. The input power calculator 43 increases the target output value $P_O^*$ using the conversion loss parameter W or η to calculate a target value of the input power $P_I$ (hereinafter referred to a target input value $P_I^*$). The operation controller 44 operates the main circuit 2 such that the calculated input power $P_I$ is input to the main circuit 2.

The resonant inverter device 1 may be a vehicle-mounted resonant inverter device. The electrical resonance load 8 is an electrical discharge reactor adapted to generate ozone. The resonant inverter device 1 is configured to generate ozone using the electrical discharge reactor to thereby reform exhaust gas exhausted from a vehicle engine.

The main circuit 2 includes a plurality of switching elements 21, a transformer 22, and a capacitor 25. The first switching element $21_A$ and the second switching element $21_B$ form a push-pull circuit 26. The third switching element $21_C$, the fourth switching element $21_D$, and the capacitor 25 form a resonant tank circuit 27.

Figure 4:
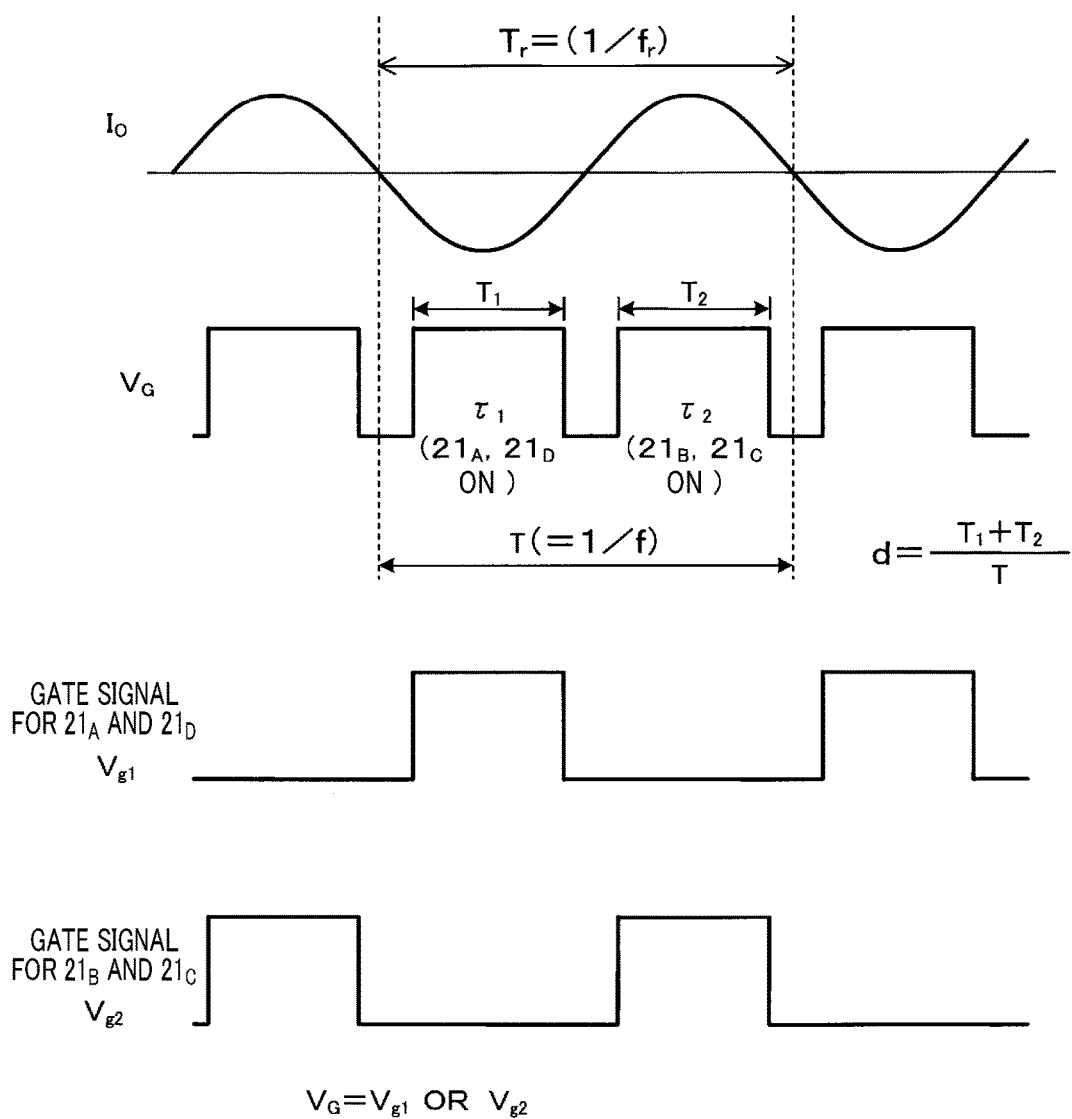
FIG. 4 is a waveform diagram for output current IO and gate voltage VG in accordance with the first embodiment.

As shown in FIG. 4, the operation of the main circuit 2 alternates between a period $T_1$ during which the first switching element $21_A$ and the fourth switching element $21_D$ are both on and a period $T_2$ during which the second switching element $21_B$ and the third switching element $21_C$ are both on. A primary current is thereby passed through a primary coil 221 of the transformer 22, which causes a secondary current IO to pass through a secondary coil 222 of the transformer 22 as FIGS. 1 and 4. The number of turns of the secondary coil 222 is greater than the number of turns of the primary coil 221. The secondary current IO resonates at a resonance frequency $f_r$ (=$1/2\pi\sqrt{LC}$) determined by the electrostatic capacitance C of the resonance load 8 and the leakage inductance L. The step-up effect produced by a turns ratio of the transformer and the step-up effect produced by the resonance are superimposed, resulting in a high secondary voltage $V_O$. This causes electrical discharge of the resonance load 8 (electrical discharge reactor).

As shown in FIG. 1, the input power measurer 3 includes a voltage sensor $31_V$ to measure a voltage $V_B$ of the DC power source 7 and a current sensor $31_A$ to measure a current $I_B$ following from the DC power source 7. These sensors $31_A$, $31_V$ are electrically connected to the controller 4. In the present embodiment, as described above, the transformer 22 produces a high secondary voltage $V_O$ which is difficult to directly measure. That is, the output power $P_O$ is difficult to directly measure. The input power $P_I$ is relatively readily measurable. This is why the input power $P_I$ is measured.

The controller 4 includes the input 41, the deriver 42, the input power calculator 43, and the operation controller 44. The operation controller 44 includes a duty cycle controller 441, a frequency controller 442, a burst controller 443, a multiplier 444, and a selector 445. The duty cycle controller 441 controls the duty cycle d (see FIG. 4) of the switching elements 21. The frequency controller 442 controls the frequency f. The burst controller 443 controls the intermittence rate b (see FIG. 5) as described later.

The controller 4 brings output power $P_O$ of the main circuit 2 to the target output value $P_O^*$ by controlling the frequency f, the duty cycle d, and the intermittence rate b of the switching elements 21. As shown in FIG. 4, the frequency f is 1/T where T represents a period of gate voltage VG and the duty cycle d is $(T_1+T_2)/T$.

Figure 2:
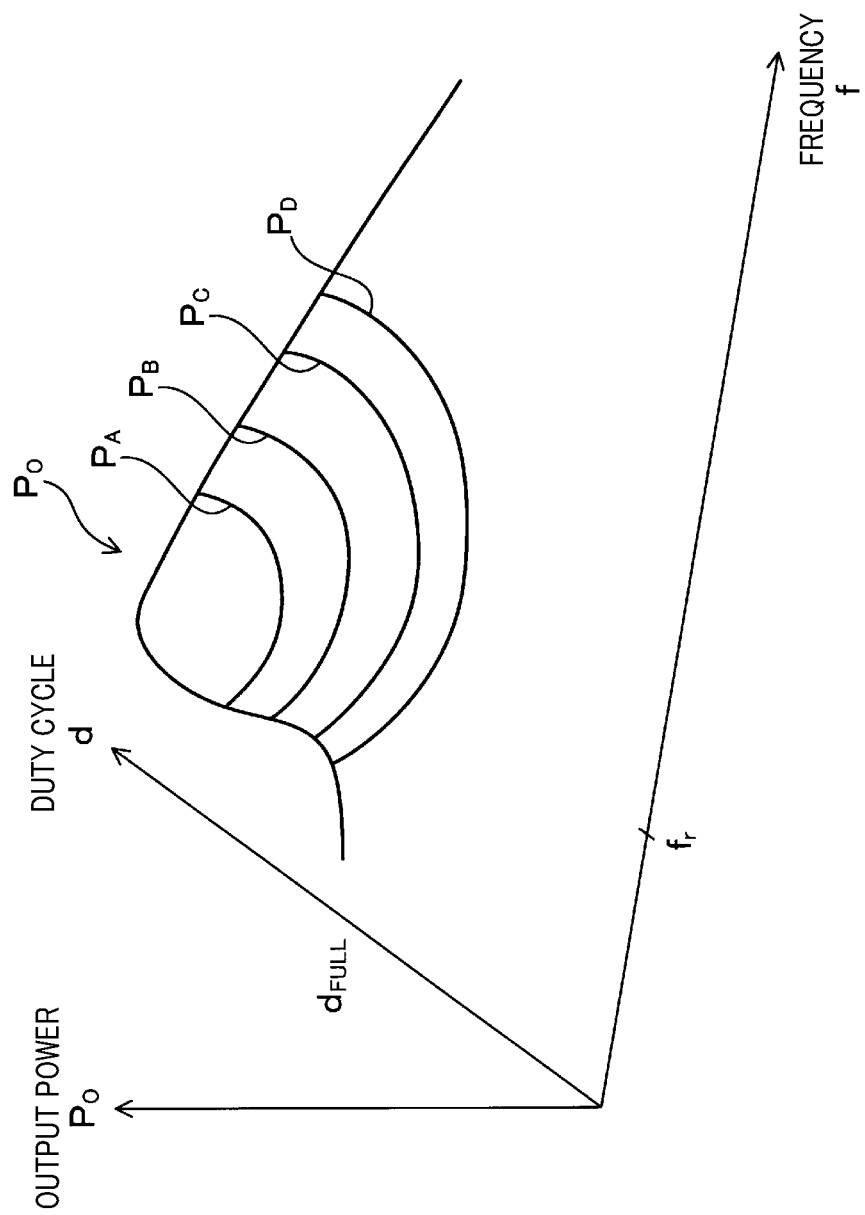
FIG. 2 is a three-dimensional graph illustrating a relationship between duty cycle, frequency, and output power in accordance with the first embodiment.

FIG. 2 is a 3-dimensional graph illustrating a relationship between the duty cycle d, the frequency f, and the output power $P_O$, where level lines of the output power $P_O$ ($P_A$, $P_B$, $P_C$, $P_D$) are depicted. Given a constant duty cycle d, the output power $P_O$ increases as the frequency f approaches the resonance frequency fr. Given a constant frequency f, the output power $P_O$ increases as the duty cycle d increases. The duty cycle d never becomes equal to or greater than the full duty cycle $d_{FULL}$ that is an upper limit of the duty cycle d.

Figure 3:
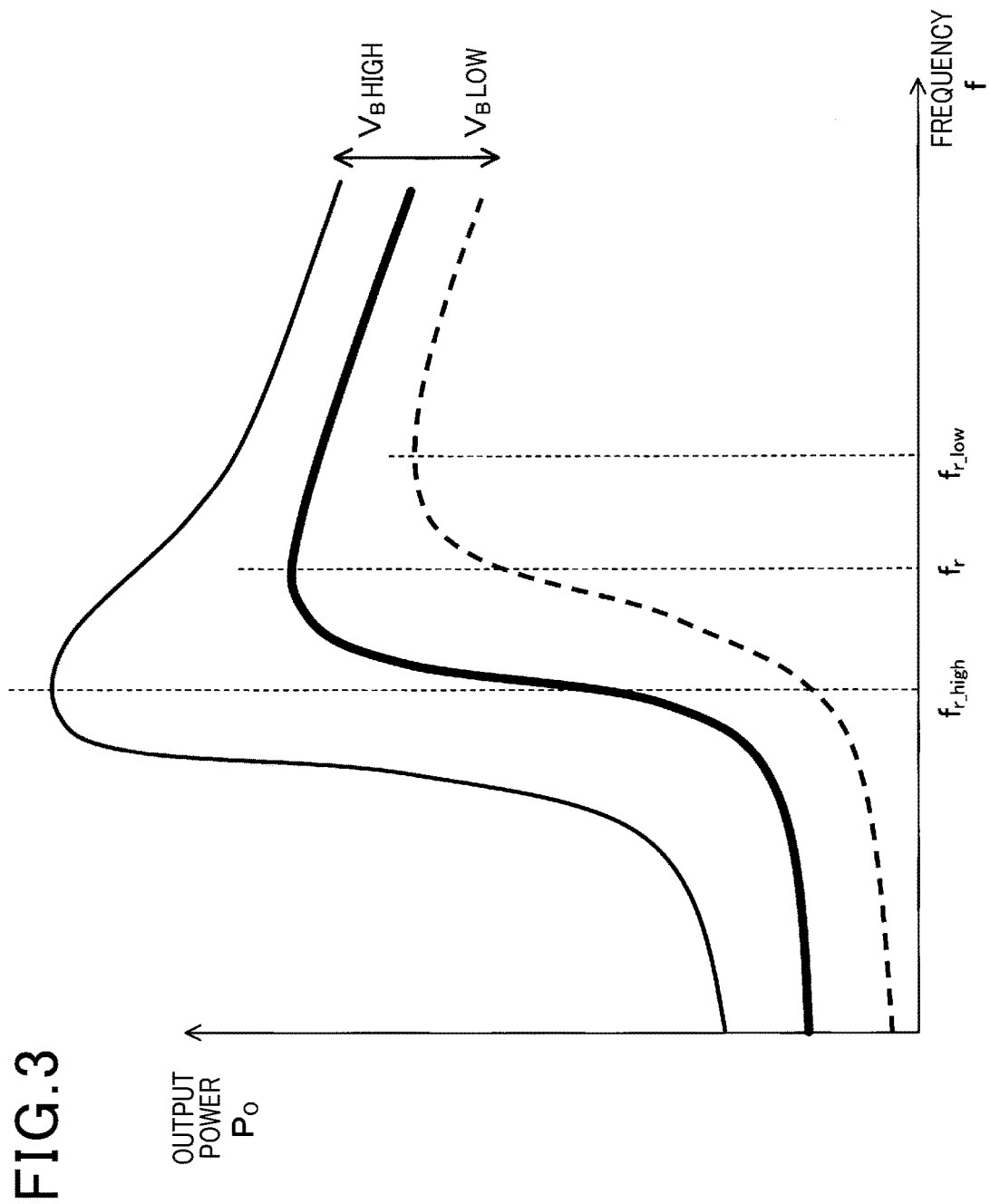
FIG. 3 is a graph illustrating a relationship between frequency and output power when the duty cycle is fixed in accordance with the first embodiment.

FIG. 3 illustrates a relationship between the output power $P_O$ and the frequency f, given a constant duty cycle d. The output power $P_O$ increases as the frequency f approaches the resonance frequency $f_r$. When the voltage $V_B$ of the DC power source 7 is high, the output power $P_O$ becomes high. When the voltage $V_B$ is low, the output power $P_O$ becomes low.

In the present embodiment, a lead battery is used as the DC power source 7. The DC power source 7 may be electrically connected not only to the resonant inverter device 1, but also to various loads, such as an air conditioner and lights. Thus, the voltage $V_B$ of the DC power source 7 may abruptly change depending on usage conditions of the loads. In such an event, the output power $P_O$ may deviate from the target output value $P_O^*$.

In the present embodiment, even if the output power $P_O$ abruptly deviates from the target output value $P_O^*$ due to an abrupt change in the voltage $V_B$, processing described below allows the output power $P_O$ to return to the target output value $P_O^*$ in a short time.

For example, when the voltage $V_B$ of the DC power source 7 abruptly or sharply drops, that is, when the output power $P_O$ drops, the controller 4 increases the duty cycle d of the switching elements 21 with the frequency f fixed, thereby increasing the output power $P_O$. The duty cycle d is feedforward controlled using the voltage $V_B$. The feedforward control is less accurate, but can be performed in a short time. Therefore, feedforward control of the duty cycle d can bring back the output power $P_O$ relatively close to the target output value $P_O^*$ in a short time. After feedforward control of the duty cycle d is performed, the frequency f is feedback controlled. Feedback control of the frequency f is time-consuming, but can accurately bring back the output power $P_O$ close to the target output value $P_O^*$. In the present embodiment, when the output power $P_O$ significantly changes, the controller 4 performs feedforward control of the duty cycle d to bring back the output power $P_O$ close to the target output value $P_O^*$ in a short time and thereafter performs feedback control of the frequency f to bring the output power $P_O$ closer to the target output value $P_O^*$.

Figure 5:
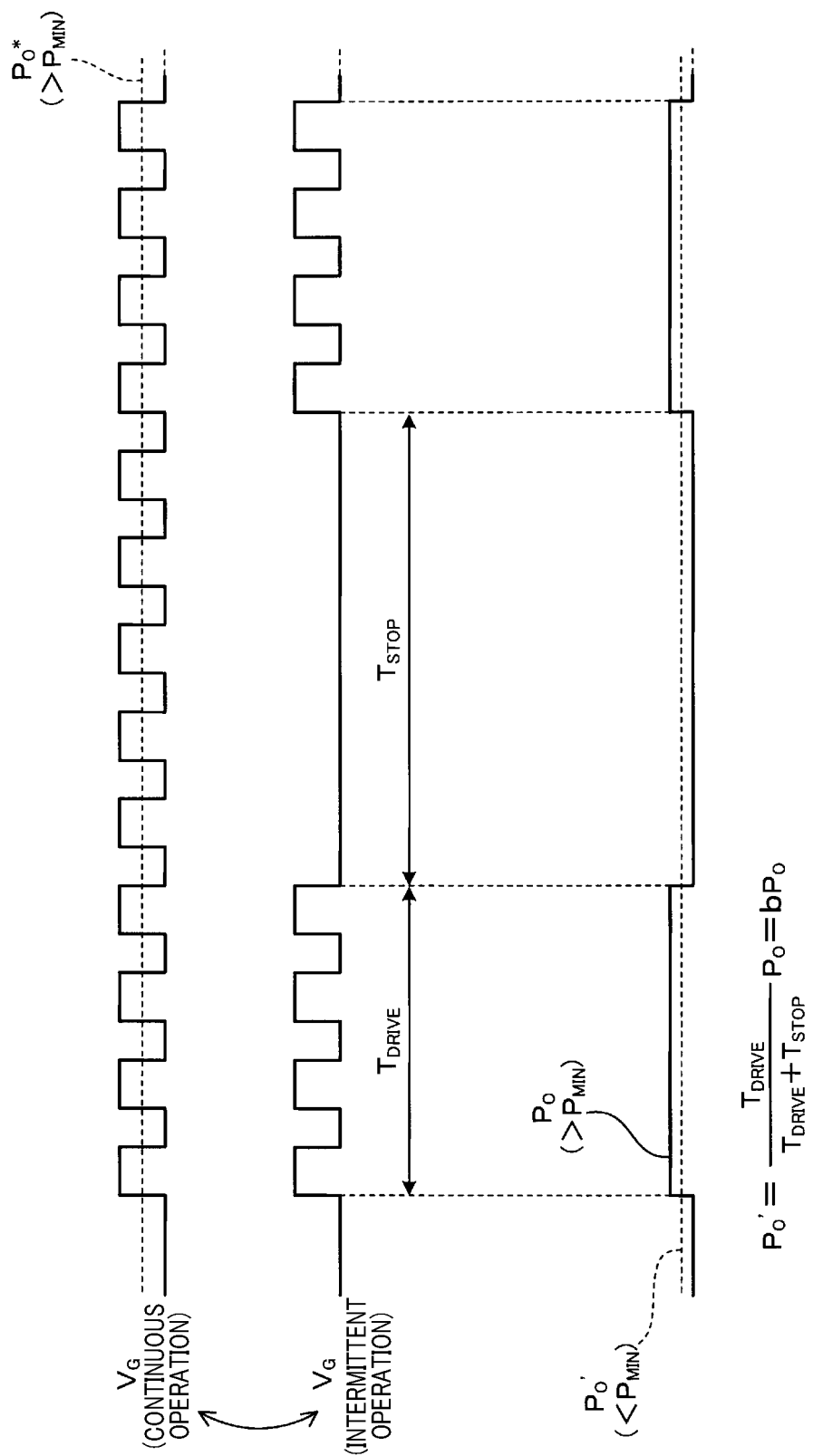
FIG. 5 is an illustration of burst control in accordance with the first embodiment.
Figure 6:
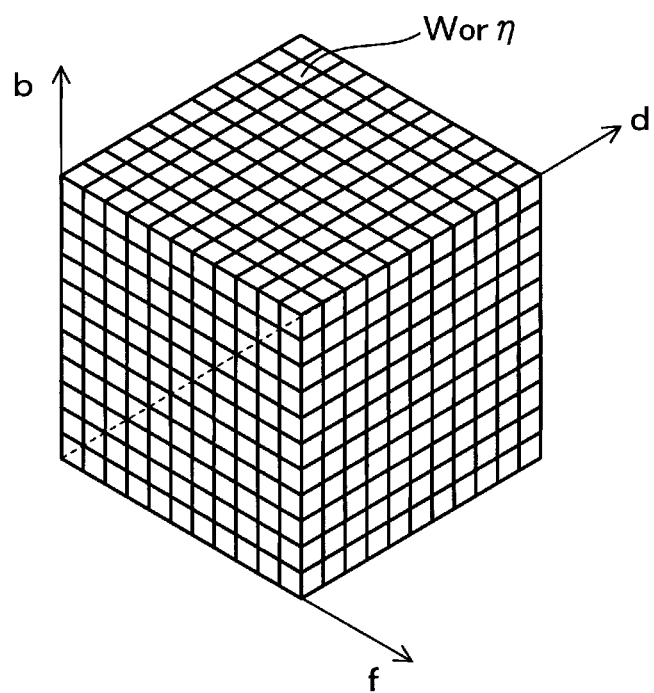
FIG. 6 a schematic diagram of information stored in a storage in accordance with the first embodiment.

As described above, in the present embodiment, the electrical discharge reactor is used as the resonance load 8. The electrical discharge reactor has a property that the electrical discharge reactor does not discharge unless supplied with output power $P_O$ equal to or greater than minimum output power $P_{MIN}$. As shown in FIG. 5, when the target output value $P_O^*$ is equal to or greater than the minimum output power $P_{MIN}$, the switching elements 21 are continuously operated. When the target output value $P_O^*$ is less than the minimum output power $P_{MIN}$, the switching elements 21 are intermittently operated. The intermittent operation of the switching elements 21 alternates between a drive period $T_{DRIVE}$ and a rest period $T_{STOP}$ during which the switching elements 21 are not being operated. In the drive period $T_{DRIVE}$, the output power $P_O$ equal to or greater than the minimum output power $P_{MIN}$ is supplied to the resonance load 8 (electrical discharge reactor), which causes the resonance load 8 to discharge. An average $P_O'$ of the output power $P_O$ is set equal to or less than the minimum output power $P_{MIN}$ and set close to the target output value $P_O^*$. In the present embodiment, the intermittence rate b (=$T_{DRIVE}$/($T_{DRIVE}$+$T_{STOP}$)) is controlled, thereby controlling the average $P_O'$ of the output power $P_O$.

The configuration of the controller 4 will now be described with reference to FIG. 1. As described above, the controller 4 includes the input 41, the deriver 42, the input power calculator 43, and the operation controller 44. The operation controller 44 includes the duty cycle controller 441, the frequency controller 442, the burst controller 443, the multiplier 444, and the selector 445. A measurement of the voltage $V_B$ acquired by the voltage sensor $31_V$ is input to the multiplier 444 and the duty cycle controller 441. The duty cycle controller 441 feedforward controls the duty cycle d using the measurement of the voltage $V_B$. The duty cycle d is input to the deriver 42.

A measurement of the current $I_B$ acquired by the current sensor $31_A$ is input to the multiplier 444. The multiplier 444 multiplies the measurement of the voltage $V_B$ by the measurement of the current $I_B$ to calculate input power $P_I$. The calculated input power $P_I$ is input to the frequency controller 442 and the burst controller 443.

In addition to the input power $P_I$, the target input power $P_I^*$ or the minimum output power $P_{MIN}$ is input to the frequency controller 442. The frequency controller 442 feedback controls the frequency f of the switching elements 21 using these inputs. The frequency f is input to the deriver 42.

The input power $P_I$, the target input value $P_I^*$, and the minimum output power $P_{MIN}$ are input to the burst controller 443. The burst controller 443 determines the intermittence rate b (see FIG. 5) using these inputs. The determined intermittence rate b is input to the deriver 42.

The deriver 42 includes a storage 420. The storage 420 stores a relationship between the duty cycle d, the frequency f, the intermittence rate b, and the conversion loss parameter in form of a table (see FIG. 6). The deriver 42 reads the conversion loss parameter (the power loss W or the circuit efficiency η) corresponding to the input control variables d, f, b from the stored information (i.e., the table) and outputs the read conversion loss parameter to the input power calculator 43.

For example, when the power loss W is used as the conversion loss parameter, the input power calculator 43 calculates the target input value $P_I^*$ by adding the power loss W to the target output value $P_O^*$ ($P_I^*$=W+$P_O^*$). When the circuit efficiency η is used as the conversion loss parameter, the input power calculator 43 calculates the target input value $P_I^*$ by dividing the target output value $P_O^*$ by the circuit efficiency η ($P_I^*$=$P_O^*$/η).

The target input value $P_I^*$ is input to the selector 445 and the burst controller 443. The selector 445 selects a higher one of the target input value $P_I^*$ and the minimum output power $P_{MIN}$ and outputs the selected one.

The present embodiment can provide the following advantages.

As described above with reference to FIG. 1, the resonant inverter device 1 includes the deriver 42 and the input power calculator 43. The deriver 42 derives the power loss W or the circuit efficiency η of the main circuit 2 as the conversion loss parameter of the main circuit 2. The input power calculator 43 increases the target output value $P_O^*$ using the conversion loss parameter W or η to calculate the target value of the input power $P_I$ (i.e., the target input value $P_I^*$).

With this configuration, the output power $P_O$ can be brought close to the target output value $P_O^*$. For example, when the power loss W is used as the conversion loss parameter, the target input value $P_I^*$ can be set to a sum of the target output value $P_O^*$ and the power loss W (i.e., $P_I^*=W+P_O^*$). When this target input value $P_I^*$ is input to the main circuit 2, the input power $P_I$ minus the power loss W will be output as the output power $P_O$. Therefore, the output power $P_O$ close to the target output value $P_O^*$ can be generated.

When the circuit efficiency η is used as the conversion loss parameter, the target input value $P_I^*$ can be set to the target output value $P_O^*$ divided by the circuit efficiency η ($P_I^*=P_O^*/\eta$). When this target input value $P_I^*$ is input to the main circuit 2, the input power $P_I$ multiplied by the circuit efficiency η will be output as the output power $P_O$. Therefore, the output power $P_O$ close to the target output value $P_O^*$ can be generated.

The deriver 42 includes the storage 420. The storage 420 stores a relationship between the input control variables d, f, b and the conversion loss parameter W or η in form of a table. The deriver 42 is configured to read the conversion loss parameter W or n corresponding to the control variables d, f, b from the stored information.

Since the conversion loss parameter is read from the above information, the conversion loss parameter W or η can be acquired in a shorter time as compared to calculating the conversion loss parameter.

As above, the resonant inverter device of the present embodiment can bring the output power closer to the target output value.

Figure 7:
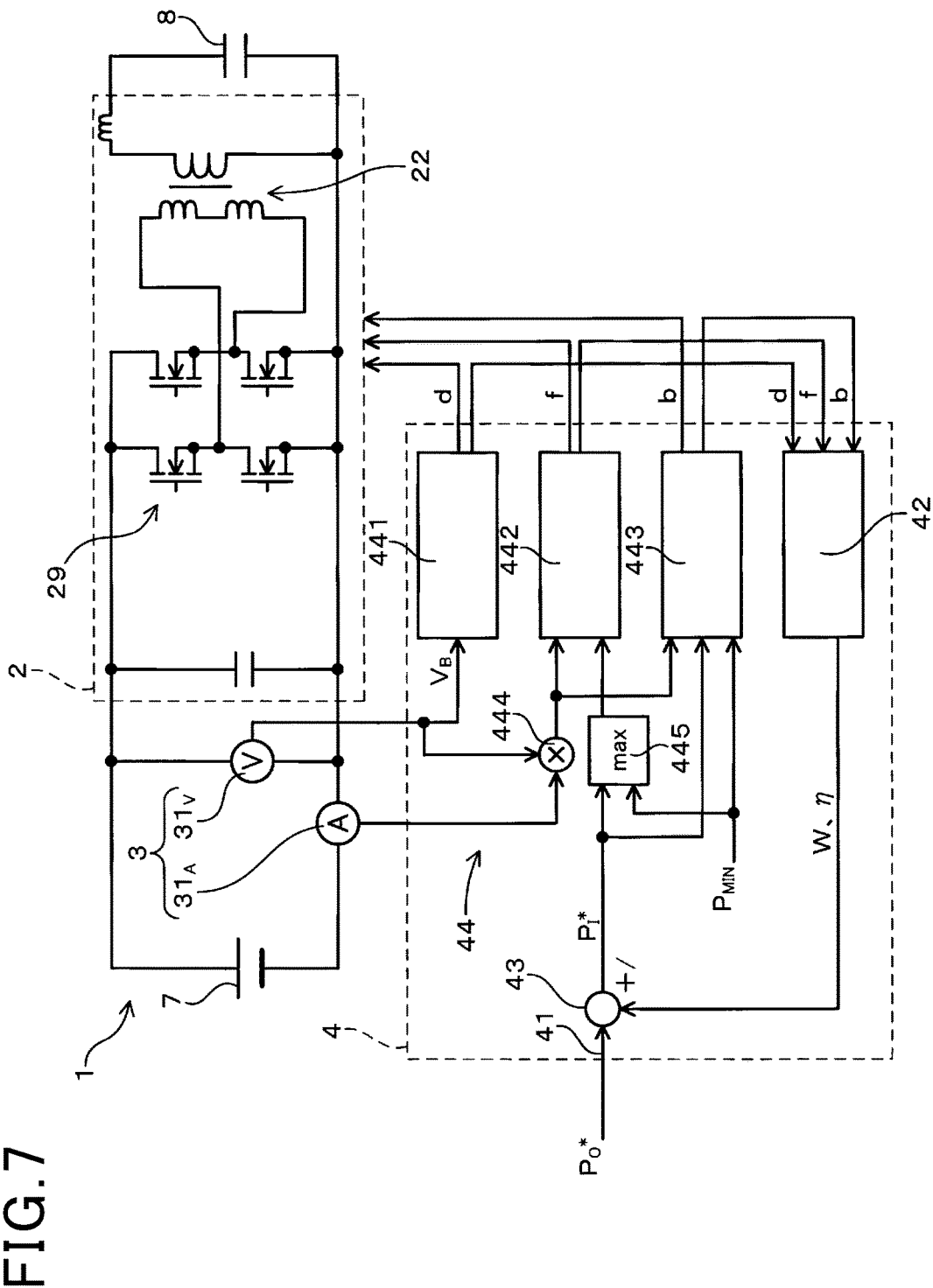
FIG. 7 is a circuit diagram of a resonant inverter device using a full-bridge circuit in accordance with a modification to the first embodiment.

In the present embodiment, as shown in FIG. 1, the main circuit 2 is configured using the push-pull circuit 26 and the resonant tank circuit 27. In an alternative embodiment, the main circuit 2, as shown in FIG. 7, may be configured using the H-bridge circuit 29.

Second Embodiment

In a second embodiment, the configuration of the deriver 42 of the first embodiment is modified. The deriver 42 (see FIG. 1), as in the first embodiment, includes a storage 420. The storage 420 stores relational expressions that relate the control variables d, f, b and the conversion loss parameter of the main circuit 2. The deriver 42 calculates the conversion loss parameter using the relational expressions and the control variables d, f, b.

The relational expressions will now be described. In the following, $m_d$, $m_{f1}$, $m_{f2}$, $m_{f3}$, $b_a$, $b_b$ are constants. $W_d$ represents a component of the power loss W that depends on the duty cycled. $W_f$ represents a component of the power loss W that depends on the frequency f. Wb represents a component of the power loss W that depends on the intermittence rate b. Wd can be expressed using the constants $m_d$, $b_a$, and the duty cycle d, as:

$$W_d = m_d d + b_a.$$

Figure 8:
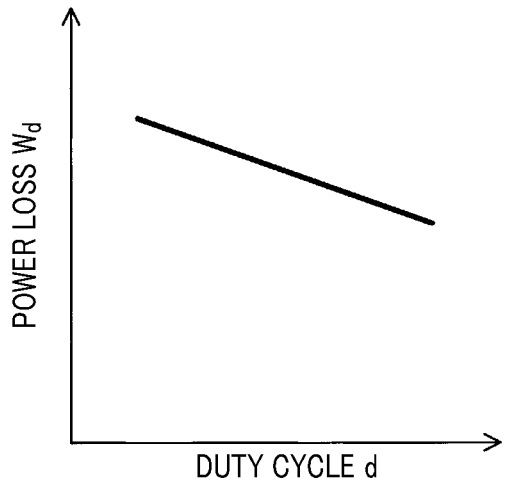
FIG. 8 is a graph illustrating a relationship between duty cycle and power loss in accordance with a second embodiment of the present disclosure.

The voltage $V_B$ of the DC power source 7 decreases in inverse proportion to the duty cycle d. Therefore, as shown in FIG. 8, the power loss $W_d$ decreases as the duty cycle d increases (i.e., as the voltage $V_B$ decreases).

$W_f$ can be expressed using the constants $m_{f1}$, $m_{f2}$, $m_{f3}$, $b_a$, and the frequency f, as:

$$W_f = m_{f1} f^3 + m_{f2} f^2 + m_{f3} f + b_a.$$

Figure 9:
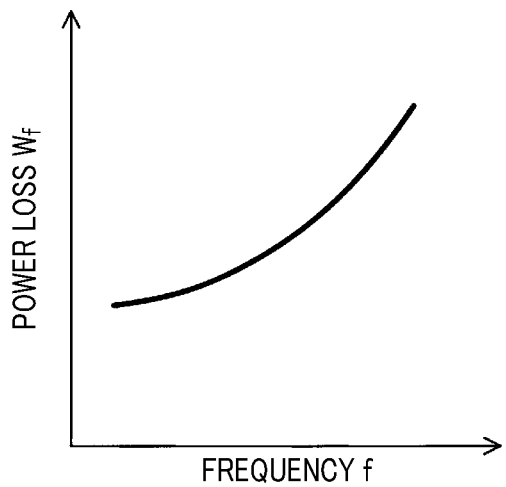
FIG. 9 is a graph illustrating a relationship between frequency and power loss in accordance with the second embodiment.

The switching loss of the switching elements 21 increases as the frequency f increases. Thus, as shown in FIG. 9, $W_f$ increases as the frequency f increases.

Figure 10:
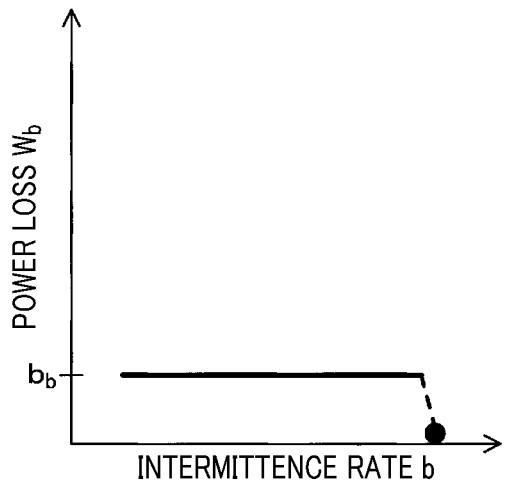
FIG. 10 is a graph illustrating a relationship between intermittence rate and power loss in accordance with the second embodiment.

When the switching elements 21 are not intermittently operated, that is, when the switching elements 21 are continuously operated, no power loss Wb due to the intermittent operation occurs, resulting in: Wb=0. When the switching elements 21 are intermittently operated, substantially constant power loss $b_b$ due to the intermittent operation does occur (see FIG. 10), resulting in: $W_b = b_b$.

Figure 11:
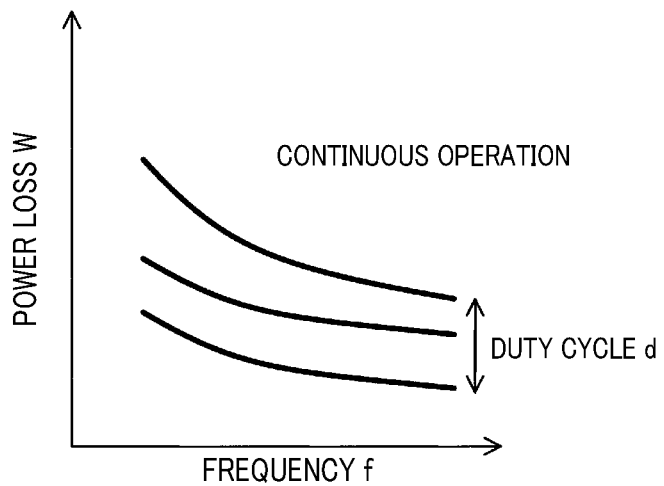
FIG. 11 is a graph illustrating a relationship between frequency, duty cycle, and power loss in the case of continuous operation in accordance with the second embodiment.
Figure 12:
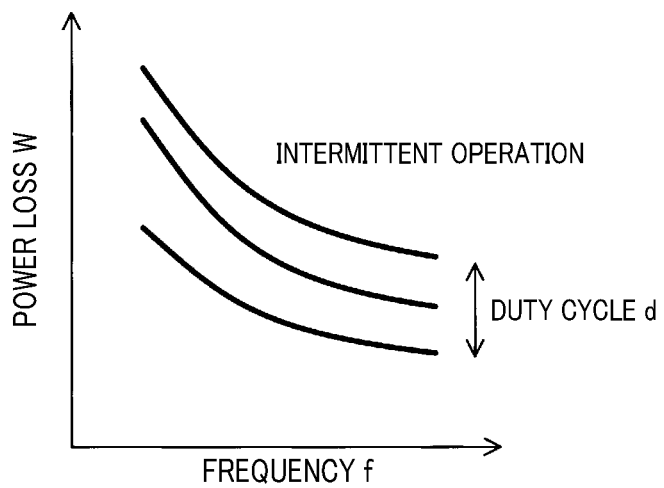
FIG. 12 is a graph illustrating a relationship between frequency, duty cycle, and power loss in the case of intermittent operation in accordance with the second embodiment.

The total power loss W can be expressed as the follows (see FIGS. 11, 12). When the switching elements 21 are continuously operated, the total power loss W can be expressed as:

$$W = m_d d(m_{f1} f^3 + m_{f2} f^2 + m_{f3} f + b_a).$$

When the switching elements 21 are intermittently operated, the total power loss W can be expressed as:

$$W = m_d d(m_{f1} f^3 + m_{f2} f^2 + m_{f3} f + b_a) + b_b.$$

These expressions may be stored in the storage 420. The power loss W can be calculated using operating variables d, f, b and the above expressions.

Relational expressions when the circuit efficiency η is used will now be described. In the following, $k_d$, $k_{f1}$, $k_{f2}$, $k_{f3}$, a, $a_b$ are constants. $\eta_d$ represents a component of the circuit efficiency η that depends on the duty cycle d. $\eta_f$ represents a component of the circuit efficiency η that depends on the frequency f. $\eta_b$ represents a component of the circuit efficiency η that depends on the intermittence rate b. $\eta_d$ can be expressed using the constants $k_d$, a and the duty cycle d, as:

$$\eta_d = k_d d + a.$$

Figure 13:
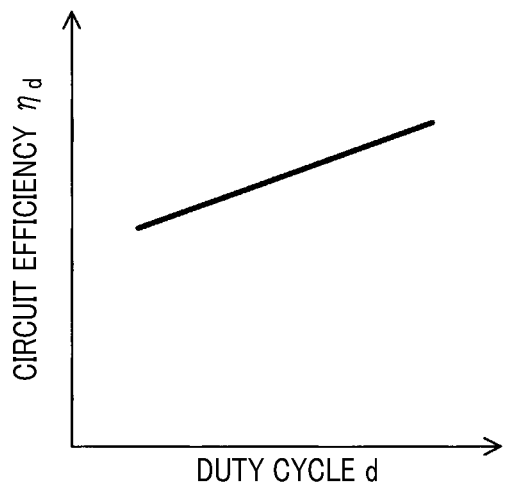
FIG. 13 is a graph illustrating a relationship between duty cycle and circuit efficiency in accordance with the second embodiment.

As described above, the voltage $V_B$ of the DC power source 7 decreases in inverse proportion to the duty cycled. As shown in FIG. 13, a heat generation amount of the main circuit 2 decreases as the duty cycle d increases (i.e., as the voltage $V_B$ decreases), resulting in increasing circuit efficiency $\eta_d$.

$\eta_f$ can be expressed using the constants $k_{f1}$, $k_{f2}$, $k_{f3}$, a, and the frequency f, as:

$$\eta_f = k_{f1} f^3 + k_{f2} f^2 + k_{f3} f + a.$$

Figure 14:
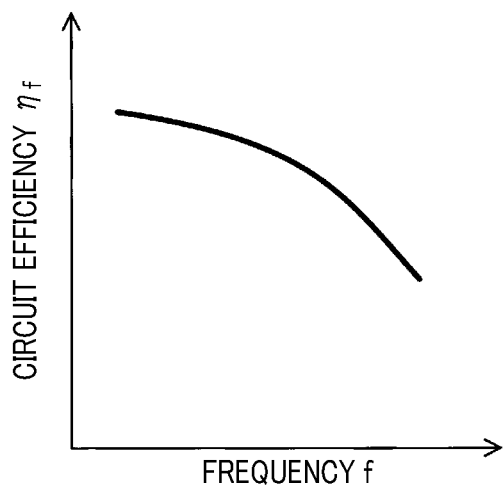
FIG. 14 is a graph illustrating a relationship between frequency and circuit efficiency in accordance with the second embodiment.

The switching loss increases as the frequency f increases. Therefore, as shown in FIG. 14, a heat generation amount of the main circuit 2 increases as the frequency f increases, resulting in decreasing circuit efficiency $\eta_d$.

When the switching elements 21 are continuously operated, no decrease in the efficiency $\eta_b$ due to the intermittent operation occurs, resulting in:

$$\eta_b = 0.$$

Figure 15:
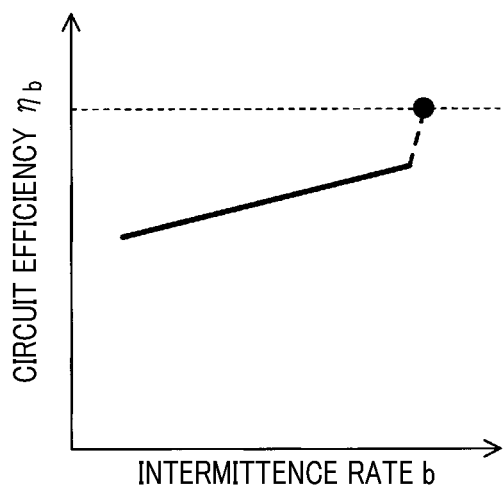
FIG. 15 is a graph illustrating a relationship between intermittence rate and circuit efficiency in accordance with the second embodiment.

When the switching elements 21 are intermittently operated, $\eta_b$ can be expressed as a linear function of the intermittence rate b (see FIG. 15):

$$\eta_b = k_b b + a_b.$$

Figure 16:
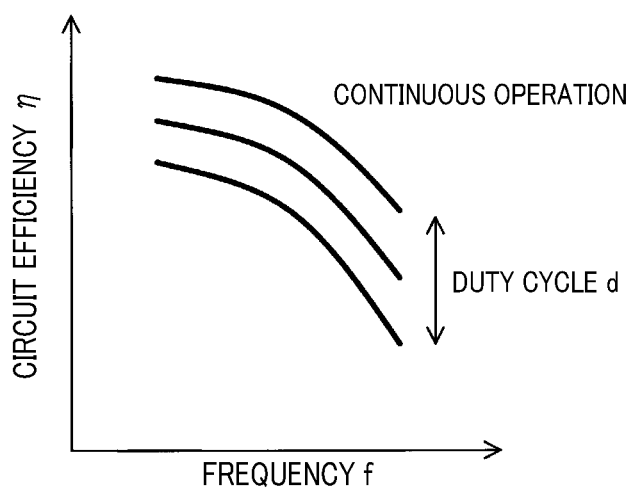
FIG. 16 is a graph illustrating a relationship between frequency, duty cycle, and power loss in the case of continuous operation in accordance with the second embodiment.
Figure 17:
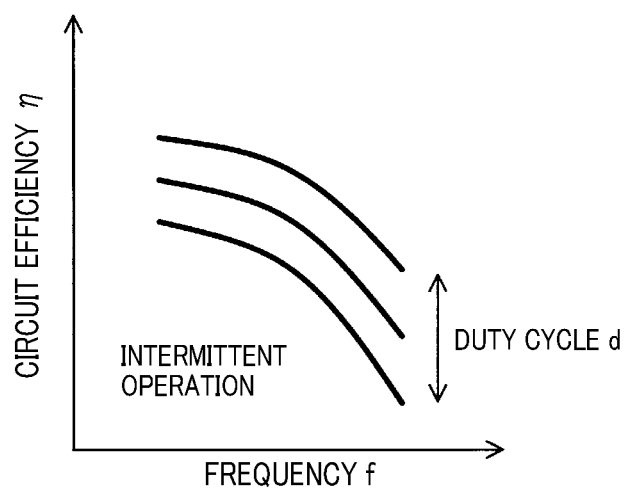
FIG. 17 is a graph illustrating a relationship between frequency, duty cycle, and circuit efficiency in the case of intermittent operation in accordance with the second embodiment.

The total circuit efficiency η can be expressed as the follows (see FIGS. 16, 17). When the switching elements 21 are continuously operated, the total circuit efficiency η can be expressed as:

$$\eta = k_d d(k_{f1} f^3 + k_{f2} f^2 + k_{f3} f + a).$$

When the switching elements 21 are intermittently operated, the total circuit efficiency η can be expressed as:

$$\eta = k_d d(k_{f1} f^3 + k_{f2} f^2 + k_{f3} f + a) + k_b b + a_b.$$

These expressions may be stored in the storage 420. The total circuit efficiency η can be calculated using control variables d, f, b and the above expressions.

The present embodiment can provide the following advantages in addition to the advantages of the first embodiment.

In the present embodiment, the above relational expressions are stored in storage 420. The conversion loss parameter W or η is calculated using the control variables d, f, b and the above relational expressions.

With this configuration, as in the first embodiment, an amount of stored data can be reduced as compared to storing all the relationships between the conversion loss parameter and the control variables d, f, b, which allows for using the storage 420 having a small storage capacity.

Third Embodiment

Figure 18:
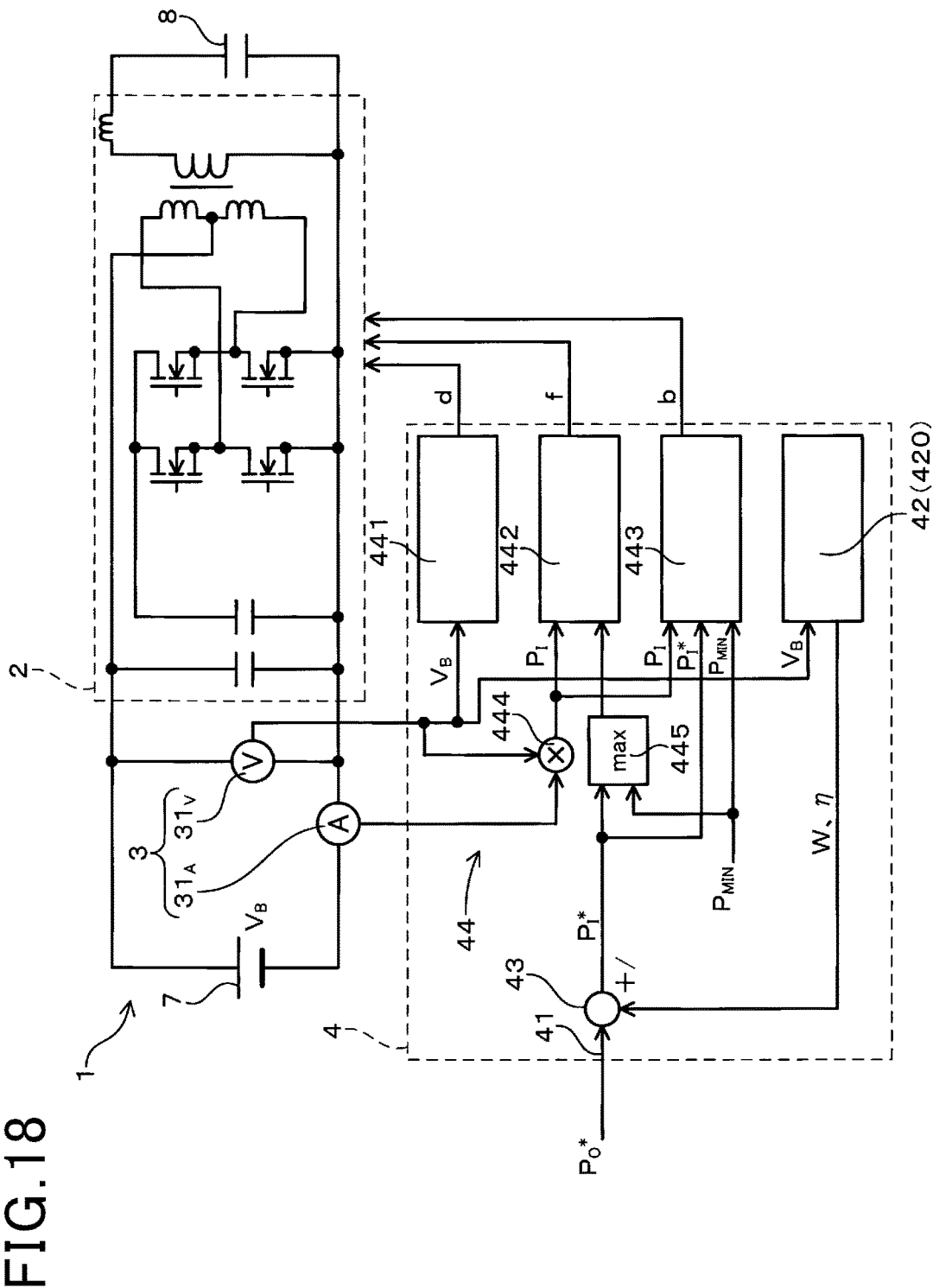
FIG. 18 is a circuit diagram of a resonant inverter device in accordance with a third embodiment of the present disclosure.

In a third embodiment, the configuration of the controller 4 of the first embodiment is modified. As shown in FIG. 18, a measurement of the voltage $V_B$ of the DC power source 7 acquired by the voltage sensor $31_V$ are input to the deriver 42. The conversion loss parameter W or η is derived using the measurement of the voltage $V_B$. In deriving the conversion loss parameter, as in the first embodiment, a relationship between the conversion loss parameter and the voltage $V_B$ is stored in the storage 420. The conversion loss parameter corresponding to the voltage $V_B$ is read from the stored information. In an alternative embodiment, as in the second embodiment, relational expressions that relate the conversion loss parameter and the voltage $V_B$ may be stored in the storage 420. The conversion loss parameter may be calculated using the stored relational expressions.

The present embodiment can provide the following advantages in addition to the advantages of the first embodiment. With the configuration set forth above, the conversion loss parameter can be derived using the measurement of the voltage $V_B$. Therefore, errors are less likely to occur as compared to setting the duty cycle using the voltage $V_B$ and deriving the conversion loss parameter using the duty cycle as in the first embodiment. Therefore, the conversion loss parameter can more accurately be calculated.

In the present embodiment, the conversion loss parameter is derived using only the power-source voltage $V_B$. In an alternative embodiment, the conversion loss parameter may be derived using not only the power-source voltage $V_B$, but also the frequency f and the intermittence rate b.

Fourth Embodiment

Figure 19:
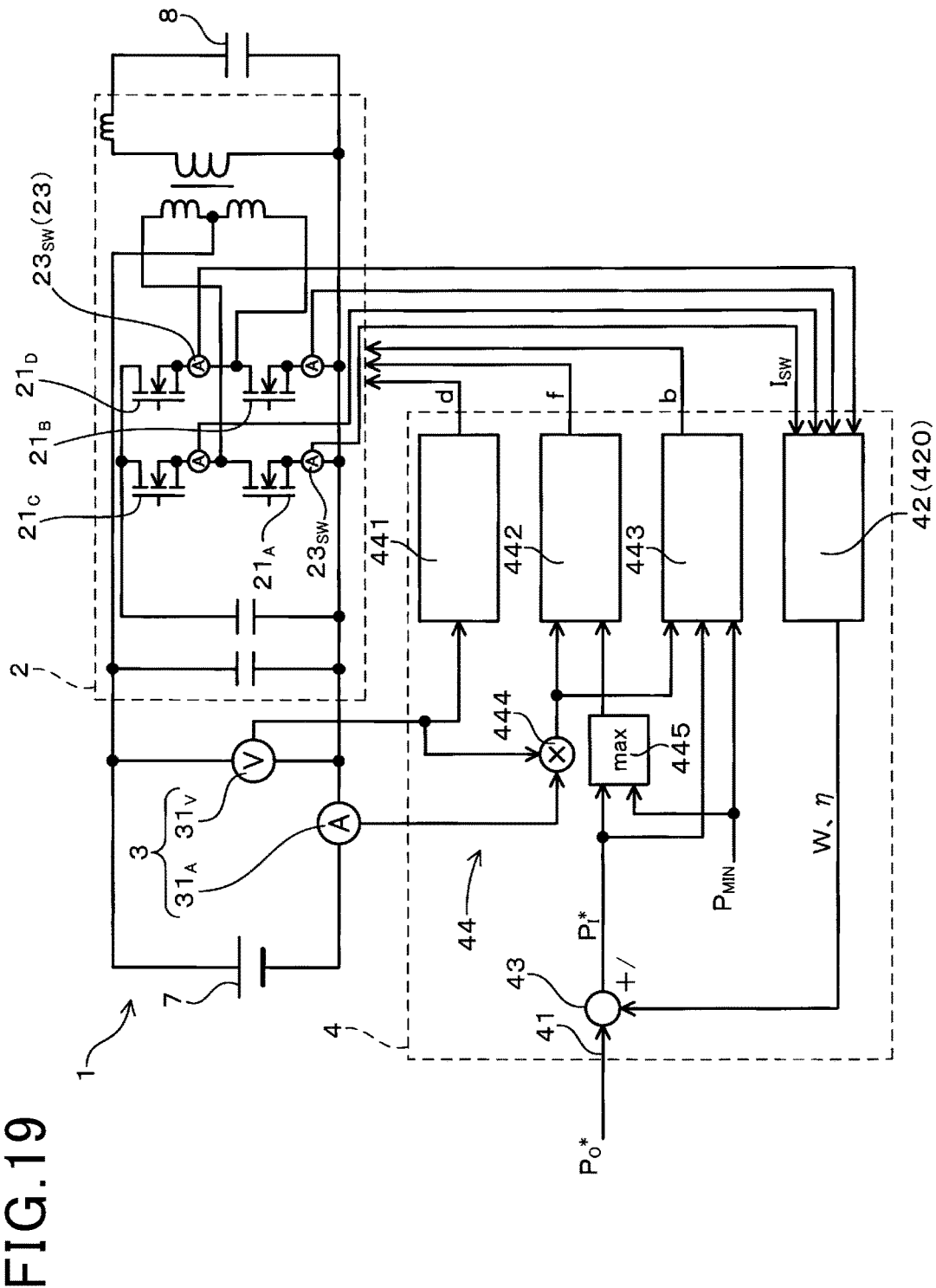
FIG. 19 is a circuit diagram of a resonant inverter device in accordance with a fourth embodiment of the present disclosure.

In a fourth embodiment, the calculation method of the conversion loss parameter is modified. As shown in FIG. 19, the switching elements 21 are provided with switching-element current sensors $23_{SW}$, one for each switching element 21. Each switching-element current sensor $23_{SW}$ may use a shunt resistor or a Hall element, a current transformer or the like. In the present embodiment, a current through each switching element 21 is measured using an associated one of the switching-element current sensors $23_{SW}$. The measured current values are input to the deriver 42. The deriver 42 calculates the power loss W of the main circuit 2 using these measured current values.

Figure 20:
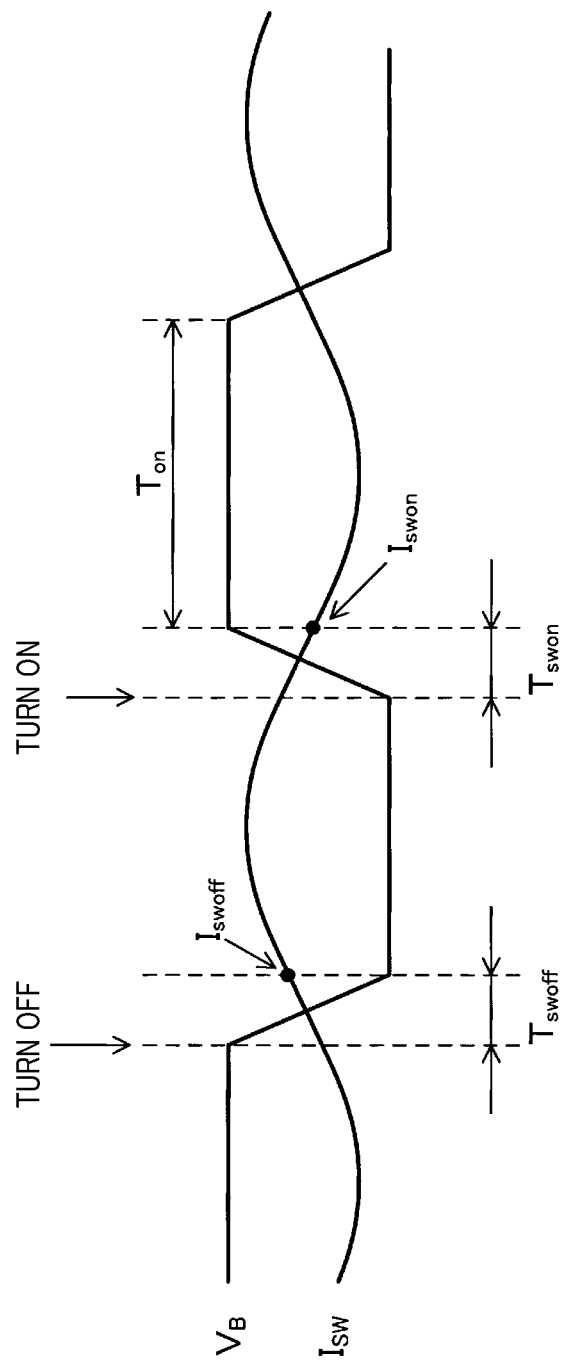
FIG. 20 is a waveform diagram for power-source voltage and switching current in accordance with the fourth embodiment.

The calculation method of the power loss W will now be described. The switching loss $W_{sw}$ of the switching elements 21 (i.e., the loss caused when turned on or off) can be expressed as:

$$W_{sw} = 2V_B \{I_{swon}T_{swon} + I_{swoff}T_{swoff}\}/6 \cdot f,$$

where $V_B$ represents a voltage of the DC power source 7, $I_{swon}$ represents a current value when each switching element 21 is turned on, $T_{swon}$ represents a turn-on time, $I_{swoff}$ represents a current value when each switching element 21 is turned off, and $T_{swoff}$ represents a turn-off time (see FIG. 20).

A conduction loss $W_{on}$ of the switching elements 21 (the loss caused when turned on or off) can be expressed as:

$$W_{on} = 2I_{swrms}^2 R_{on} T_{on} f,$$

where $I_{swrms}$ represents an effective value of the current $I_{sw}$ through each switching element 21, $R_{on}$ represents an on resistance of each switching element 21, $T_{on}$ represents an on time of each switching element 21 (see FIG. 20).

These relational expressions are stored in the storage 420. Using these relational expressions, the deriver 42 calculates the power loss W ($=W_{sw}+W_{on}$) of the main circuit 2. In the above relational expressions, $I_{sw}$, $I_{swoff}$, $I_{swrms}$ are measured by the respective switching-element current sensors $23_{SW}$. The frequency f and the on time $T_{on}$ are determined by the operation controller 44. The voltage $V_B$ of the DC power source 7 is measured by the voltage sensor $31_V$. The turn-on time $T_{swon}$, the turn-off time $T_{swoff}$, and the on resistance $R_{on}$ are constants associated with the switching elements 21 and are therefore pre-stored in the storage 420.

The present embodiment can provide the following advantages in addition to the advantages of the first embodiment. In the present embodiment, the power loss W is calculated using the measurement of the current $I_{sw}$ through each switching element 21 acquired by the switching-element current sensors $23_{SW}$. With this configuration, the power loss W can be calculated to reflect the actual state of the main circuit 2. Therefore, the power loss W can more accurately be calculated.

In the present embodiment, the power loss W is calculated using the above relational expressions. In an alternative embodiment, a relationship between the measurement of the current $I_{sw}$ and the power loss W may be stored in the storage 420. The power loss W may then be read from the stored information. In another alternative embodiment, the circuit efficiency η may be used instead of the power loss W.

In the present embodiment, as shown in FIG. 19, the switching elements 21 are provided with the switching-element current sensors $23_{SW}$, one for each switching element 21. In an alternative embodiment, at least one of the switching elements 21 may be provided with the switching-element current sensor $23_{SW}$.

Fifth Embodiment

Figure 21:
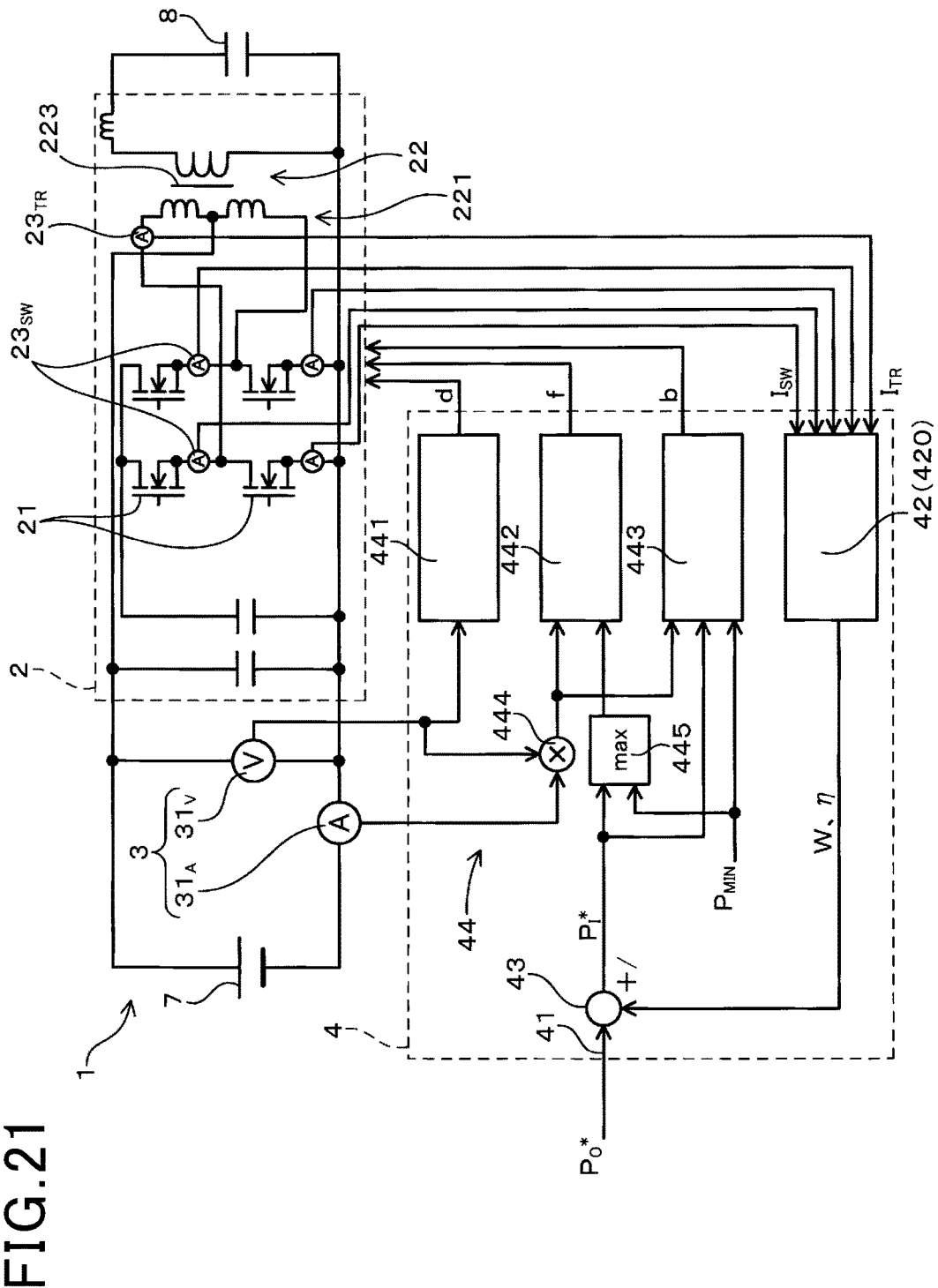
FIG. 21 is a circuit diagram of a resonant inverter device in accordance with a fifth embodiment of the present disclosure.

In a fifth embodiment, the deviation method of the conversion loss parameter is modified. As shown in FIG. 21, the transformer 22 is provided with a transformer current sensor $23_{TR}$. The primary current $I_{tr1}$ of the transformer 22 is measured using the transformer current sensor $23_{TR}$. The deriver 42 calculates a loss $W_{TR}$ of the transformer 22 using a measurement of the primary current $I_{tr1}$.

The calculation method of the loss $W_{TR}$ will now be described. A primary copper loss $W_{corr1}$ of the transformer 22 can be expressed as:

$$W_{corr1} = 2I_{tr1}^2 R_{tr1},$$

where $I_{tr1}$ represents the primary current, $R_{tr1}$ represents a resistance of the primary coil 221, K represents a proportionality coefficient, B represents a magnetic flux density of the core 223, a represses a magnetic flux density coefficient, b represents a frequency coefficient, and $V_e$ represents an effective volume of the core 223. An iron loss $W_{iron}$ of the transformer 22 can be expressed as: $W_{iron} = KB^a f^b V_e$.

These relational expressions are stored in the storage 420. The loss of the transformer 22 is calculated using the measurement of the primary current $I_{tr1}$ and the above relational expressions, as:

$$W_{tr} = W_{corr1} + W_{iron}.$$

The total power loss of the main circuit 2 is calculated using the calculated loss $W_{tr}$ and the loss $W_{sw}$ of the switching elements 21 as:

$$W = W_{tr} + W_{sw}.$$

The resistance $R_{tr1}$, the constants K, a, b, $V_e$ used in the above relational expressions are stored in the storage 420. The magnetic flux density B can be calculated as:

$$B = V_B d/f/N_p/A_e,$$

where $N_p$ represents the number of turns of the primary coil 221 and $A_e$ represents an effective cross-sectional area of the core 223.

The present embodiment can provide the following advantages in addition to the advantages of the first embodiment. In the present embodiment, the total power loss W of the main circuit 2 can be calculated using not only the loss $W_{sw}$ of the switching elements 21, but also the loss $W_{tr}$ of the transformer 22. Therefore, the power loss W can more accurately be calculated.

In the present embodiment, the power loss W is calculated using the primary current $I_{tr1}$. In an alternative embodiment, the circuit efficiency η may be calculated instead of the power loss W. In another alternative embodiment, a relationship between the primary current $I_{tr1}$ and the conversion loss parameter W or η may be stored in the storage 420. The conversion loss parameter W or η may be read from the stored information.

Sixth Embodiment

Figure 22:
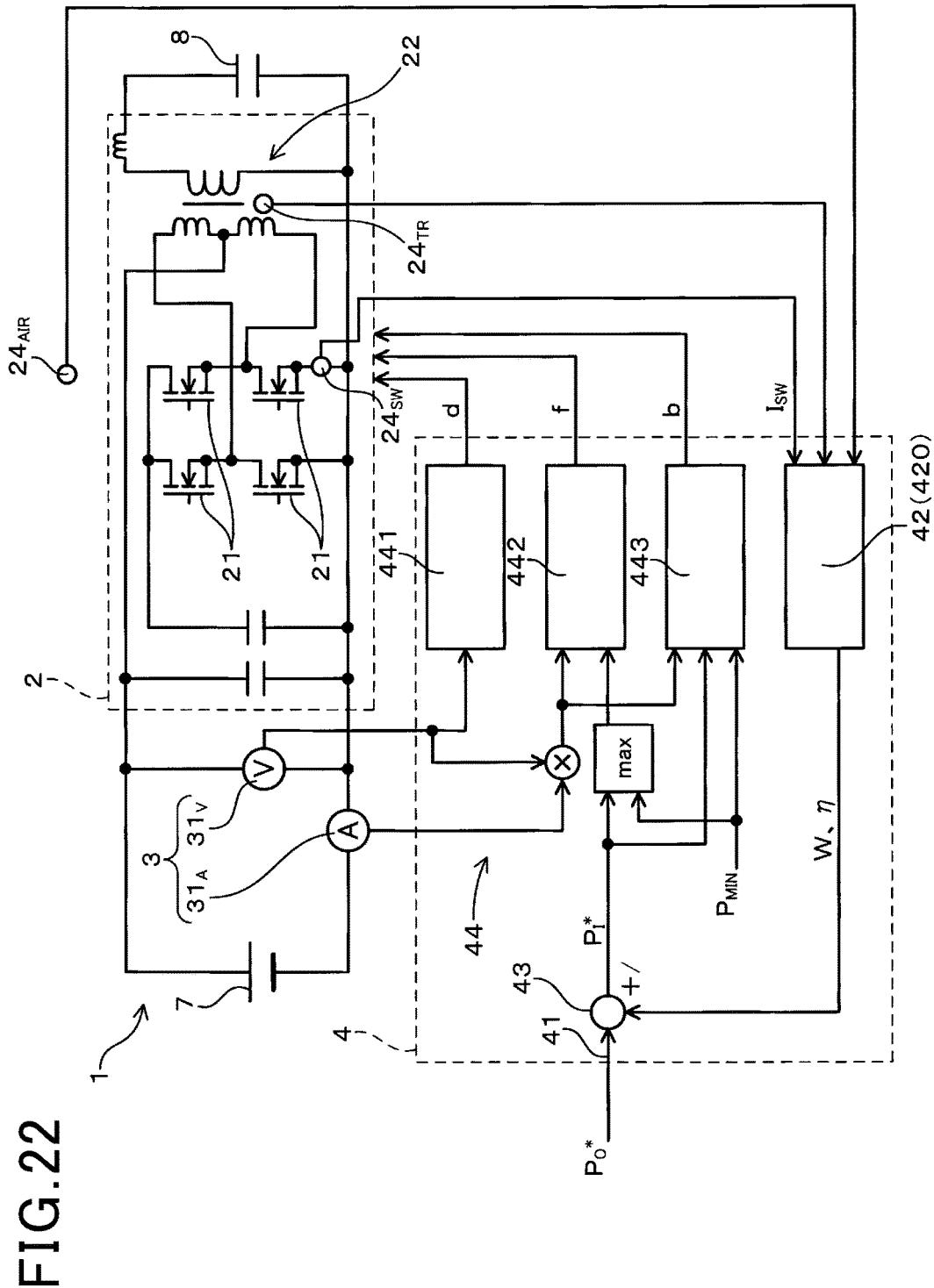
FIG. 22 is a circuit diagram of a resonant inverter device in accordance with a sixth embodiment of the present disclosure.

In a sixth embodiment, the calculation method of the conversion loss parameter is modified. As shown in FIG. 22, the switching elements 21 are provided with a switching-element temperature sensor $24_{SW}$ to measure a temperature $T_{sw}$ of the switching elements 21. The transformer 22 is provided with a transformer temperature sensor $24_{TR}$ to measure a temperature $T_{tr}$ of the transformer 22. A room temperature sensor $24_A$ is provided to measure a temperature $T_a$ of air within the resonant inverter 1. Each temperature sensor 24 may be a thermistor, a fiber-optic thermometer or the like. The deriver 42 calculates the power loss W of the main circuit 2 using temperature measurements of the temperature sensor 24.

The power loss W can be calculated using the following relational expressions:

$$W_{sw} = (T_{sw} - T_a)/\theta_{swa}, \text{ and}$$

$$W_{tr} = (T_{tr} - T_a)/\theta_{tra}.$$

In the above relational expressions, $\theta_{swa}$ represents a thermal resistance between the switching elements 21 and the air and $\theta_{tra}$ represents a thermal resistance between the transformer 22 and the air. The deriver 22 calculates the loss $W_{sw}$ of the switching elements 21 and the loss $W_{tr}$ of the transformer 22 using these relational expressions. The total power loss of the main circuit 2 is a sum of these losses, that is, $W = W_{sw} + W_{tr}$.

In the present embodiment, the power loss W is calculated using the temperature measurements. In an alternative embodiment, the circuit efficiency η may be calculated instead of the power loss W. In another alternative embodiment, a relationship between the temperatures and the conversion loss parameter W or η may be stored. The conversion loss parameter W or η may be read from the stored information.

In the present embodiment, both of the set of the switching elements 21 and the transformer 22 are provided with the respective temperature sensors 24. In an alternative embodiment, either the set of switching elements 21 or the transformer 22 may be provided with the temperature sensor 24.

Seventh Embodiment

Figure 23:
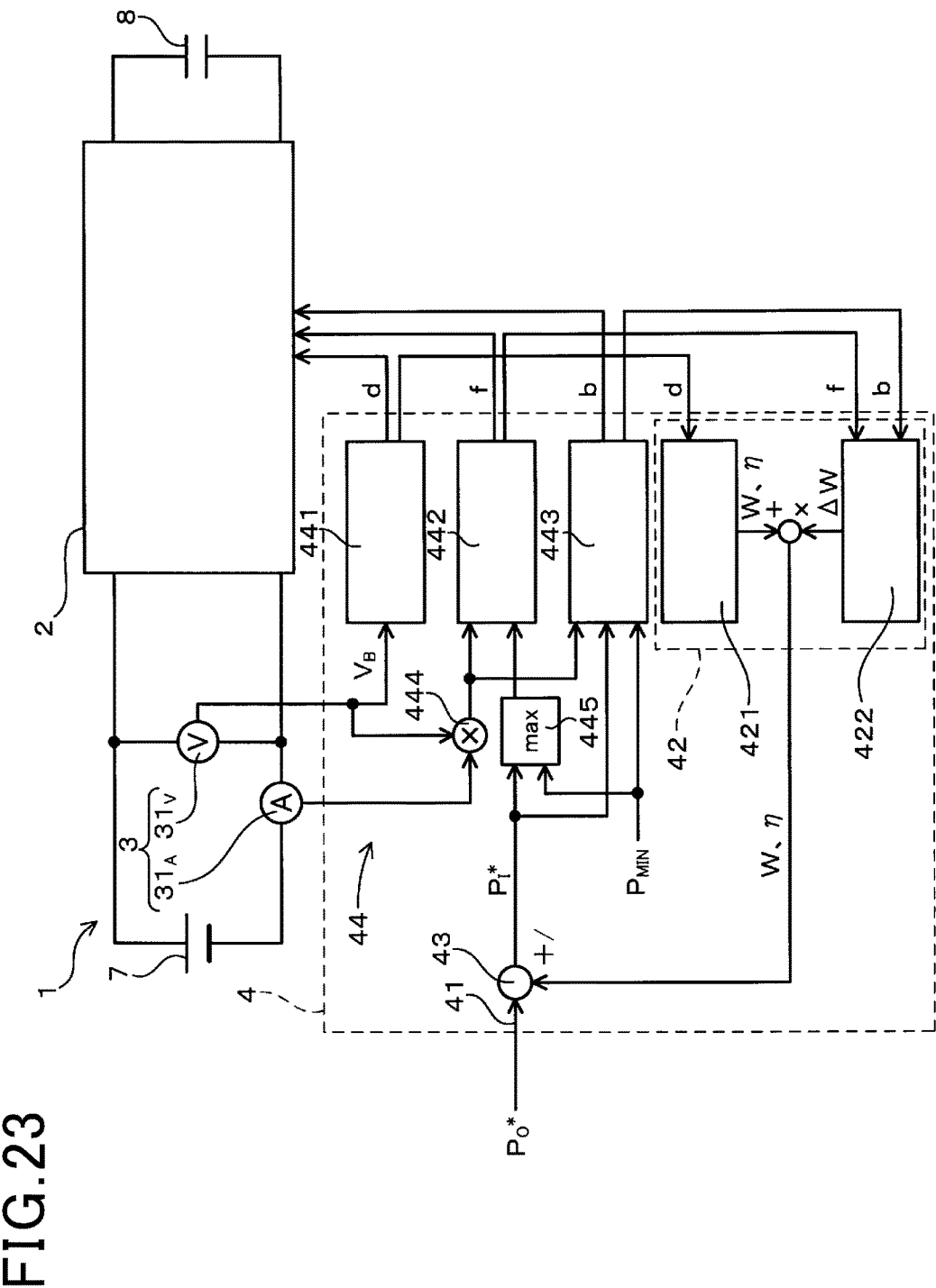
FIG. 23 is a circuit diagram of a resonant inverter device in accordance with a seventh embodiment of the present disclosure.

In a seventh embodiment, the configuration of the deriver 42 of the first embodiment is modified. As shown in FIG. 23, the deriver 42 includes a main deriver 421 and an auxiliary deriver 422. The main deriver 421 calculates the conversion loss parameter W or η using the duty cycle d of the switching elements 21. The auxiliary deriver 422 corrects the conversion loss parameter W or η using information other than the duty cycle d of the main circuit 2 and the voltage $V_B$. The target input value $P_I^*$ is calculated using the corrected conversion loss parameter W or η.

More specifically, the auxiliary deriver 422 is configured to correct the conversion loss parameter W or η using the frequency f and the intermittence rate b.

Figure 24:
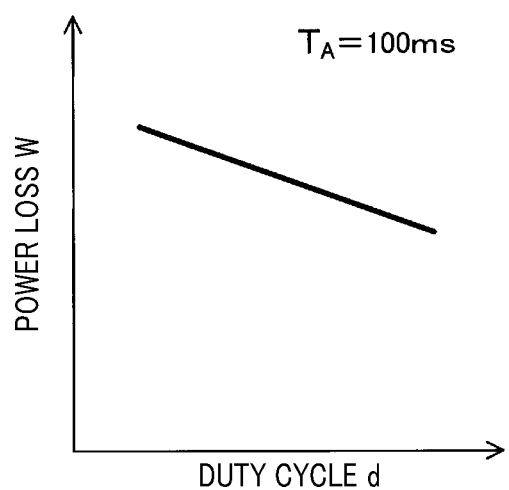
FIG. 24 is a graph illustrating a relationship between duty cycle and power loss in accordance with the seventh embodiment.
Figure 25:
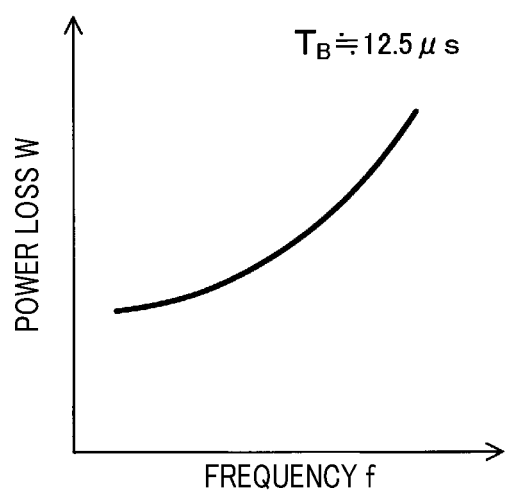
FIG. 25 is a graph illustrating a relationship between frequency and power loss in accordance with the seventh embodiment.

The main deriver 421 stores a relational expression between the duty cycle d and the power loss W (see FIG. 24). As in the second embodiment, the power loss W can be expressed as:

$$W = m_d d + b_a.$$

The main deriver 421 calculates the power loss W every about 100 milliseconds (ms). That is, the control period of the main deriver 421 is about 100 ms.

The auxiliary deriver 422 stores the following relational expression;

$$\Delta W = m_{f1} f^3 + m_{f2} f^2 + m_{f3} f + b_a,$$

where $\Delta W$ represents a correction amount of the power loss W. The auxiliary deriver 422 calculates the correction amount $\Delta W$ every about 12.5 μs. That is, the control period of the auxiliary deriver 422 is about 12.5 μs.

In the above relational expressions, each of $m_d$ and $b_a$ has the same meaning as described in the second embodiment.

The deriver 42 multiplies the power loss W derived by the main deriver 421 by the correction amount $\Delta W$, thereby correcting the power loss W.

The present embodiment can provide the following advantages in addition to the advantages of the first embodiment. In the present embodiment, the deriver 42 includes the main deriver 421 that derives the conversion loss parameter and the auxiliary deriver 422 that corrects the derived conversion loss parameter.

This configuration can distribute processing in the deriver 42 between the main deriver 421 and the auxiliary deriver 422, which can reduce the entire load on the deriver 42. In addition, the main deriver 421 derives the conversion loss parameter using the duty cycle d. The duty cycle d is a control variable that contributes significantly to the conversion loss parameter. Therefore, an approximation value of the conversion loss parameter can be calculated using the duty cycle d. The number of variables (one in the present embodiment) used to calculate the conversion loss parameter can be reduced, which can reduce the processing load on the main deriver 421.

In the present embodiment. The control period $T_A$ of the main deriver 421 is set greater than the control period $T_B$ of the auxiliary deriver 422, which can reduce the processing load on the main deriver 421.

In the present embodiment, the main deriver 421 derives the conversion loss parameter using the duty cycle d. In an alternative embodiment, the main deriver 421 may derive the conversion loss parameter using a measurement of the voltage $V_B$ of the DC power source 7.

In the present embodiment, the power loss W is calculated. In an alternative embodiment, the circuit efficiency η may be calculated instead of the power loss W. In another alternative embodiment, a relationship between the duty cycle d and the conversion loss parameter may be stored. The conversion loss parameter may be read from the stored information.

Eighth Embodiment

Figure 26:
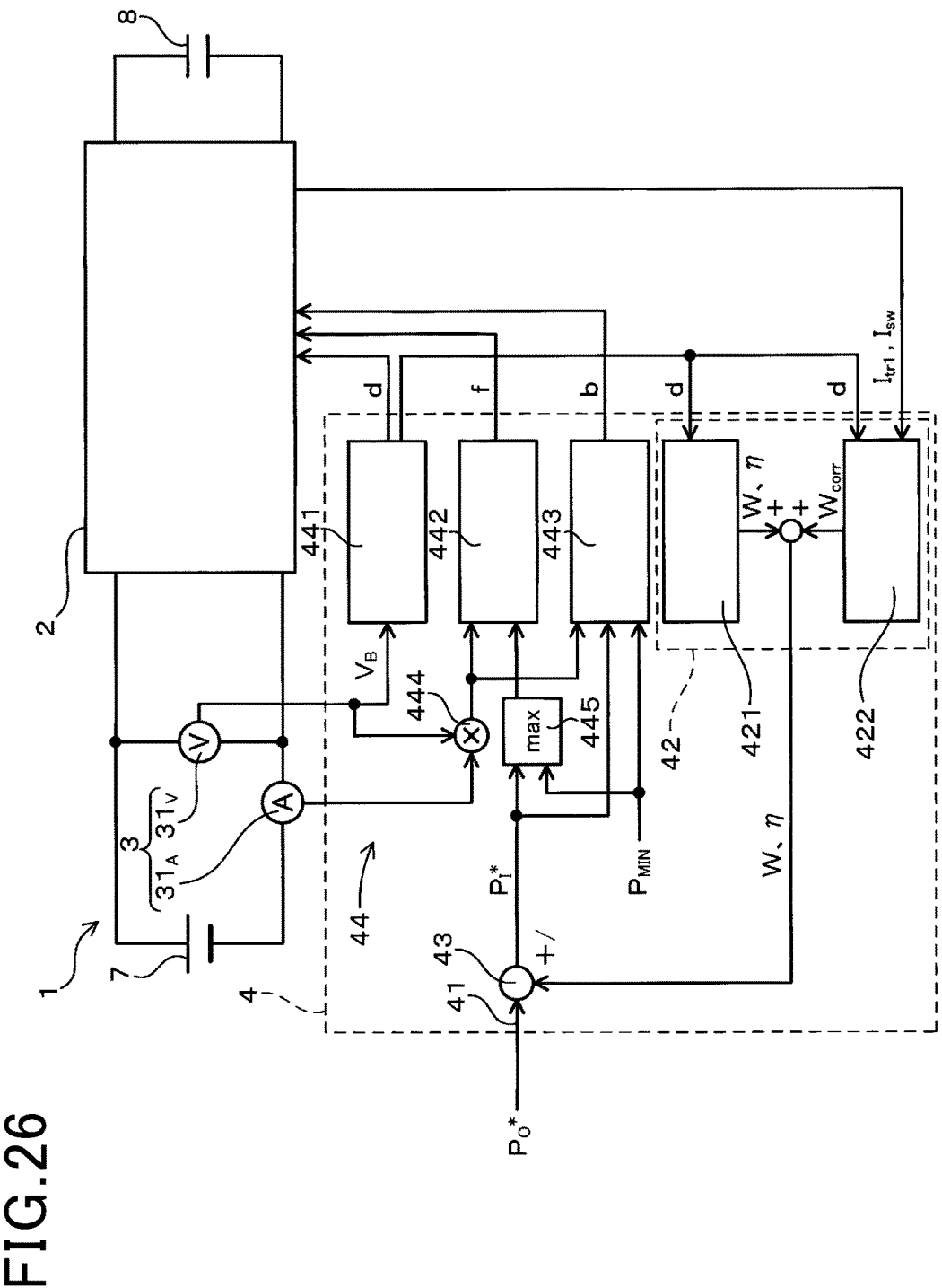
FIG. 26 is a circuit diagram of a resonant inverter device in accordance with an eighth embodiment of the present disclosure.

In an eighth embodiment, the deviation method of the conversion loss parameter is modified. As shown in FIG. 26, the resonant inverter device 1 includes the main deriver 421 and the auxiliary deriver 422, as in the seventh embodiment. The duty cycle d is input to the main deriver 421. The main deriver 421 calculates the conversion loss parameter W or η using the duty cycle d. As in the fifth embodiment, the main circuit 2 is provided with the switching-element current sensors $23_{SW}$ and the transformer current sensor $23_{TR}$ (see FIG. 21). The current $I_{SW}$ through the switching elements 21 and the primary current $I_{tr1}$ through the transformer 22 are measured by these current sensors $23_{SW}$, $23_{TR}$. A measurement of the current $I_{SW}$ and a measurement of the primary current $I_{tr1}$ are input to the auxiliary deriver 422. The duty cycle d is also input to the auxiliary deriver 422.

The main deriver 421 stores the duty cycle d, the power loss W, and a relational expression. As in the seventh embodiment, this relational expression can be expressed as:

$$W = m_a d + b_a.$$

The main deriver 421 calculates the power loss W using this relational expression. As in the seventh embodiment, the control period of the main deriver 421 is about 100 ms.

Figure 27:
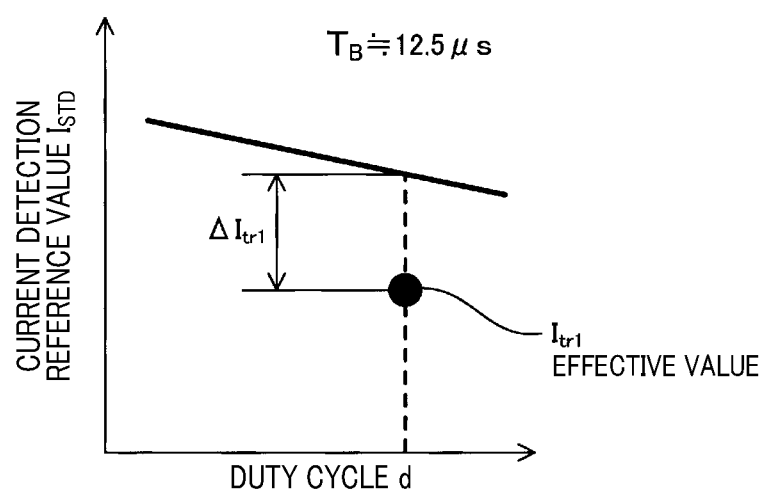
FIG. 27 is a graph illustrating a relationship between duty cycle and current detection reference value in accordance with the eighth embodiment.

The auxiliary deriver 422 stores a relationship between the duty cycle d and a current detection reference value $I_{STD}$ as a map as shown in FIG. 27. For example, the auxiliary deriver 422 calculates a difference $\Delta I_{tr1}$ between the measurement of the primary current $I_{tr1}$ and the $I_{STD}$. The copper loss $W_{corr}$ of the transformer 22 can be expressed as follows:

$$W_{corr} = 2\Delta I_{tr1}^2 R_{tr1},$$

where $R_{tr1}$ represents a resistance of the primary coil 221. As in the seventh embodiment, the control period of the auxiliary deriver 422 is about 12.5 μs.

The current detection reference value $I_{STD}$ refers to a value of current through the transformer 22 (or the witching elements 21) to which the duty cycle d (proportional to the DC power source voltage) corresponds according to a preset map. In processing performed by main deriver 421 (every 100 ms), the current detection reference value $I_{STD}$ corresponding to the duty cycle d is initially selected to calculate the power loss W. In correction processing performed by the auxiliary deriver 422 (every 12.5 μs) within the first control period of the main deriver 421, the correction loss $W_{corr}$ is calculated as a function of a difference between the actually detected current value and the detection reference value $I_{STD}$. The power loss W calculated by the main deriver 421 is corrected using the calculated correction loss $W_{corr}$.

As show in FIG. 26, the deriver 42 adds the copper loss $W_{corr}$ of the transformer 22 to the power loss W calculated by the main deriver 421, thereby correcting the power loss W.

In the present embodiment, the power loss W is corrected using the primary current $I_{tr1}$ of the transformer 22. In an alternative embodiment, the power loss W may be corrected using the current $I_{SW}$ through each switching element or at least one of the switching elements.

The present embodiment can provide the following advantages in addition to the advantages of the first embodiment. In the present embodiment, the deriver 42 includes the main deriver 421 and the auxiliary deriver 422.

This configuration can distribute processing in the deriver 42 between the main deriver 421 and the auxiliary deriver 422, which can reduce the entire load on the deriver 42. In addition, the control period of the main deriver 421 is set greater than that of the auxiliary deriver 422, which can further reduce the processing load on the main deriver 421.

In the present embodiment, the power loss W is corrected using the primary current $I_{tr1}$ of the transformer 22. In an alternative embodiment, the power loss W may be corrected using the current $I_{SW}$ through each switching element or at least one of the switching elements. In another alternative embayment, the transformer 22 and the set of switching elements 21 may individually be provided with the temperature sensor 24 (see FIG. 22). The power loss W may then be corrected using temperature measurements acquired by these temperature sensors 24. With this configuration, the auxiliary deriver 422 may correct the conversion loss parameter W or η using information other than the duty cycle d of the main circuit 2 and the voltage $V_B$.

What is claimed is:

1. A resonant inverter device comprising:
   a main circuit configured to convert input power supplied from a direct-current (DC) power source into alternating-current (AC) power and supply the AC power to a resonance load as output power;
   an input power measurer configured to measure the input power;
   a controller configured to control operations of the main circuit, the controller comprising:
      an input to which a target output value that is a target value of the output power is externally input;
      a deriver configured to derive a power loss or circuit efficiency of the main circuit as a conversion loss parameter of the main circuit;
      an input power calculator configured to calculate an increased target output value by increasing the target output value using the conversion loss parameter, as a target value of the input power; and
      an operation controller configured to control operations of the main circuit such that the calculated target value of the input power is input to the main circuit.

2. The resonant inverter device according to claim 1, wherein
   the deriver comprises a storage storing a relationship between control variables of the main circuit and the conversion loss parameter, and
   the deriver is configured to read the conversion loss parameter corresponding to the control variables from the stored information.

3. The resonant inverter device according to claim 1, wherein
   the deriver comprises a storage storing a relational expression that relates control variables of the main circuit and the conversion loss parameter, and the deriver is configured to calculate the conversion loss parameter using the relational expression and the control variables.

4. The resonant inverter device according to claim 1, further comprising a voltage sensor configured to measure the voltage of the DC power source,
   wherein the deriver is configured to derive the conversion loss parameter using a voltage measurement acquired by the voltage sensor.

5. The resonant inverter device according to claim 1, wherein the main circuit comprises:
   a switching element, operations of which are controlled by the controller; and
   a switching-element current sensor configured to measure a current through the switching element,
   wherein the deriver is configured to calculate the conversion loss parameter using the current measurement acquired by the switching-element current sensor.

6. The resonant inverter device according to claim 5, wherein the main circuit comprises:
   a transformer that is electrically connected to the switching element; and
   a transformer current sensor configured to measure a primary current of the transformer,
   wherein the deriver is configured to derive the conversion loss parameter using both a measurement of the current through the switching element acquired by the switching-element current sensor and a measurement of the primary current of the transformer acquired by the transformer current sensor.

7. The resonant inverter device according to claim 1, wherein the main circuit comprises:
   a switching element, operations of which are controlled by the controller;
   a transformer that is electrically connected to the switching element; and
   a temperature sensor configured to measure a temperature of at least one of the switching element and the transformer,
   wherein the deriver is configured to calculate the conversion loss parameter using a measurement of the temperature acquired by the temperature sensor.

8. The resonant inverter device according to claim 1, wherein
   the main circuit comprises a switching element, operations of which are controlled by the controller, and
   the deriver comprises:
      a main deriver configured to derive the conversion loss parameter using a duty cycle of the switching element or a voltage measurement of the DC power source; and
      an auxiliary deriver configured to correct the conversion loss parameter using information other than the duty cycle of the switching element and the voltage measurement of the DC power source.

* * * * *